United States Patent Office 2,871,189
Patented Jan. 27, 1959

2,871,189

DRILLING FLUID

John S. Brukner, Houston, Tex., assignor to The Texas Company, New York, N. Y., a corporation of Delaware No Drawing. Application February 27, 1957
Serial No. 642,654

29 Claims. (Cl. 252—8.5)

This invention relates to the drilling of wells through subsurface formations while employing drilling fluids. More particularly, this invention relates to a drilling operation, such as a rotary drilling operation which involves the circulation of a drilling fluid through the well bore and about the drilling bit, an improved drilling fluid therefor and an additive material suitable for the preparation of said drilling fluid. In a rotary drilling operation a drilling fluid is pumped down the drill stem to the drilling bit at the bottom of the bore hole. The stream of drilling fluid passes through the drilling bit and moves upwardly through the annular space between the drill stem and the well bore wall carrying with it the drilling cuttings.

In some areas, such as in the area of the Gulf Coast of Texas and Louisiana, formations known as heaving or sloughing shales are penetrated during a well drilling operation. The penetration of these formations while employing conventional aqueous or water base drilling fluids has been difficult due to the mud-making characteristics or properties of heaving shales. These shales have a tendency to distintegrate by swelling or cracking upon contact with water with the result that the walls of the bore hole become unstable or incompetent. In some instances the resulting sloughing or moving of the walls of the bore hole into the hole results in a stuck drill stem. In other instances the heaving shale material swells or sloughs or caves into the bore hole with a resulting enlargement of the bore hole and the eventual formation of a large subterranean cavity.

In addition to the above-indicated difficulty of maintaining a true bore hole when drilling through heaving shale with a conventional water base mud, the resulting finely dispersed heaving shale is taken up into the drilling fluid. Because of the mud-making properties of heaving shale the viscosity characteristics of the drilling fluid is adversely affected. Upon the continued accumulation of these finely divided heaving shale particles in the drilling fluid the viscosity of the drilling fluid usually increases excessively with the result that the drilling fluid must be thinned by the addition of costly chemicals thereto or by dilution with water. If the drilling fluid is thinned by water dilution the addition of more weighting material, such as barium sulfate (barytes), iron oxide, lead sulfide (galena) and the like is necessary to maintain a given mud weight.

Special drilling fluids or muds have been developed for drilling through heaving shale formations. One such drilling fluid which has been employed for drilling through heaving shale formations is a drilling fluid containing aqueous sodium silicate. Another drilling fluid which has been proposed for use during a drilling operation while drilling through less seriously dispersing or heaving shale formations is a high pH lime base drilling fluid. A high pH lime base drilling fluid, however, cannot be employed without considerable difficulty while drilling through the more seriously heaving shale formations. This fluid also suffers from inadequate high temperature gelation properties, i. e., this mud tends to set up to a hard, almost rock-like material when exposed to relatively high temperatures, e. g., greater than 300° F.

There has already been developed a very satisfactory drilling fluid or drilling mud for drilling through heaving shale formations. This successful drilling fluid can be briefly characterized as by an aqueous drilling fluid wherein the aqueous phase is saturated with respect to calcium hydroxide and possesses a relatively high pH, usually in the range 10–12.6, and a relatively high dissolved calcium or calcium ion concentration, at least about 200 parts per million by weight calcium. This drilling fluid is more specifically described in copending, coassigned patent application Serial No. 596,456, filed July 9, 1956 in the name of Walter J. Weiss and Wilbur L. Hall, now U. S. 2,802,783 issued August 13, 1957, which is a continuation-in-part application of patent application Serial No. 484,307 filed January 26, 1955, same inventors, now abandoned. The disclosures of the above-referred patent applications are herein specifically incorporated and made part of this disclosure. However, like the conventional high pH limed muds the above-referred highly successful high calcium content drilling fluid possesses less than desirable high temperature gelation properties.

Accordingly it is an object of this invention to provide an improved drilling fluid particularly suitable for drilling through troublesome shale formations of the heaving, sloughing, or rapidly dispersing type and possessing relatively improved high temperature gelation properties.

It is another object of this invention to provide a drilling reagent material suitable for the preparation and/or maintenance of a drilling fluid characterized by a relatively high pH and a relatively high dissolved calcium content and improved high temperature gelation properties.

These and other objects of this invention and how they are accomplished will become apparent in the light of the accompanying disclosure. In at least one embodiment of this invention at least one of the foregoing objects will be achieved.

In accordance with this invention I have provided an aqueous drilling fluid and mud particularly suitable for drilling through heaving shale and having improved high temperature gelation properties. More particularly, I have determined that an aqueous drilling fluid or mud of the type described in the above-referred patent application Serial No. 596,456 comprising an alkaline aqueous phase saturated with respect to calcium hydroxide and containing a relatively high dissolved calcium content, that is, a dissolved calcium or calcium ion content above about 200 parts per million by weight, is improved particularly with respect to high temperature gelation properties by employing associated therewith an organic water soluble oxygen-containing silicon compound.

A drilling mud in accordance with this invention would contain water, dispersed hydratable drilling clay material therein, a dispersing agent for said clayey material, a water soluble calcium salt having a solubility in water greater than that of calcium hydroxide, an alkalinity agent, such as lime or calcium hydroxide in an amount to insure that the water contained therein is saturated with respect to calcium hydroxide together with an organic water soluble oxygen-containing silicon compound such as a siliconate, a silicate, and/or a silanol, monohydric or polyhydric, separately or in admixture.

A drilling fluid in accordance with the practice of this invention may be prepared in the first instance by the addition of a drilling fluid reagent admixture to water or to water containing hydratable drilling clay material, together with the addition of the usual drilling mud additives (water loss additive, weighting material, oil, emulsifying agent and the like), if desired; or a conventional aqueous drilling fluid may be converted (broken over) to a drilling fluid in accordance with our invention by the addition thereto of the reagent admixtured is closed herein or by the separate addition of the various components making up the reagent admixture.

In the breaking over of a conventional aqueous drilling mud (water base or oil-in-water emulsion mud) to a drilling fluid in accordance with this invention an aqueous drilling fluid containing dispersed hydrated drilling clay material theren is preferably thinned in order to reduce the viscosity of the fluid so that upon the addition of the water soluble calcium salt thereto excessive thickening does not occur so that an unpumpable fluid results. It has been found that thinning a clay-water drilling fluid to a value between about 20–30 centipoises as measured at 600 R. P. M. by the Stormer viscosimeter prior to the addition of the water soluble calcium salt thereto usually permits a satisfactory, substantially trouble-free conversion. The added water soluble calcium salt usually causes a visible thickening of the fluid due to calcium ion flocculation of the hydrated drilling clay material therein. This thickening is not nearly so severe as in the case when lime (which may be quick lime or hydrated lime, calcium hydroxide) alone is added to the drilling fluid. During conversion the water soluble calcium salt is conveniently added to the drilling fluid slightly above the location where the mud ditch flows into the mud pit in order to insure adequate mixing of the added water soluble calcium salt with the drilling fluid or mud prior to the addition of the other materials which are added in accordance with our invention.

After the addition of the soluble calcium salt to the mud or simultaneously therewith when the drilling mud reagent admixture is used, an alkalinity agent, preferably calcium hydroxide (lime), for pH adjustment, a dispersing agent for the clayey material in the mud such as a lignosulfonate, e. g., an alkali metal, an alkaline earth metal and/or a heavy metal-containing lignosulfonate such as sodium lignosulfonate, calcium lignosulfonate (Kembreak or Lignox) or a ferro-chrome-containing lignosulfonate (Q-Broxin), respectively, and an organic water soluble oxygen-containing silicon compound such as Dow Corning XS–1, a water solution of sodium salts of organosilanols and organosiloxanols, e. g., sodium methyl siliconate and sodium methyl silanol and/or sodium methyl silanediol and/or sodium methyl silanetriol, are added to the mud in the pit. After the drilling mud has been satisfactorily converted the conventional mud additives, such as may be required to control or reduce water loss or to control mud weight, can be added as needed to maintain the desired mud properties.

Any water soluble calcium salt may be employed in the preparation of a drilling mud or the drilling mud reagent or additive admixture in accordance with the practice of our invention provided the calcium salt is more soluble in water, e. g., as measured at room temperature of about 15° C., than calcium hydroxide $Ca(OH)_2$ and provided the calcium salt when added to water produces or generates the desired free, dissolved calcium or calcium ion content or concentration. Satisfactory soluble calcium salts which may be employed in the practice of this invention include calcium chloride $CaCl_2$, calcium sulfate $CaSO_4$, calcium acetate $Ca(C_2H_3O_2)_2$, calcium formate $Ca(CHO_2)_2$, calcium nitrate $Ca(NO_3)_2$, calcium gluconate $Ca(CH_2OH(CHOH)_4COO)_2$. Other water soluble calcium salts may be employed. The water soluble calcium salt may be any suitable or commercially available form, anhydrous, partially or fully hydrated, flaked, powdered, prilled, lump, granular and the like.

The alkalinity agent employed in the preparation of a drilling fluid or the drilling mud reagent or additive admixture in accordance with this invention is preferably lime. The lime may be employed in any suitable or commercially available form, anhydrous, partially or fully hydrated, lump, granular, powdered and the like. Lime or calcium hydroxide is advantageously employed since it serves to provide the desired alkalinity in the aqueous phase (an alkaline aqueous phase having a pH not greater than 12.6). Lime also produces or generates dissolved calcium or calcium ions which contribute to the maintenance of the desired calcium concentration in the aqueous alkaline phase. Other suitable alkalinity agents are ammonium hydroxide and the alkali metal hydroxides such as caustic soda (NaOH) which in aqueous solution in the presence of added water soluble calcium salt by metathetical reaction produces calcium hydroxide in situ within the drilling fluid, the added water soluble calcium salt being added or present in stoichiometric excess with respect to the alkalinity agent. It is mentioned that when calcium hydroxide is employed as the alkalinity agent in the subject drilling mud the calcium hydroxide appears to function primarily as an alkalinity agent to peptize the clay dispersing agent and only incidentally functions as a calcium ion donor in the aqueous phase to modify or convert the shale since the shale is converted primarily and predominantly by the calcium ions or rather the relatively high concentration of calcium ion in the aqueous phase produced therein by the addition of the water soluble calcium salt to the drilling fluid.

Any suitable clay dispersing agent may be employed in the preparation of a drilling fluid or a drilling mud reagent or additive admixture in accordance with the practice of this invention, provided, of course, it is compatible with its environment in the additive admixture and/or in the drilling mud, i. e., it is not salted out and does not undergo a chemical reaction or a physical or chemical change which would render it unsuitable or useless as a dispersing agent. Clay dispersing or thinning agents suitable in the practice of this invention include the lignosulfonates, such as the alkali metal lignosulfonates, alkaline earth metal lignosulfonates and the heavy metal containing lignosulfonates, e. g., a lignosulfonate containing both iron and chromium. A suitable heavy metal containing lignosulfonate is Q-Broxin, a ferro-chrome lignosulfonate manufactured by the Puget Sound Pulp and Paper Company of Bellingham, Washington. Other suitable heavy metal-containing lignosulfonates include iron lignosulfonate, chrome lignosulfonate, nickel lignosulfonate, lead lignosulfonate, copper lignosulfonate, manganese lignosulfonate, molybdenum lignosulfonate, ferro-chrome lignosulfonate or mixtures and complexes thereof. Other suitable clay dispersing agents include a sodium polymeric polyphenol derivative of hemlock bark sold under the tradename Rayflo and yellow dextrin, a degradation product of starch. Other well known commercially available dispersing agents are also useful.

The drilling fluids may also include the usual water loss additives such as a prehydrolyzed starch commercially available under the trade names Impermex and My-lo-gel, carboxymethylcellulose (CMC) and the like. It would appear that an oil-in-water emulsion drilling fluid prepared in accordance with this invention exhibits low water loss properties as compared with an oil-free, water base mud also prepared in accordance with this invention. Presumably the dispersed, emulsified oil phase, usually a diesel oil fraction, inhibits water loss.

The organic water soluble oxygen-containing silicon compound employed in a drilling fluid or mud in accordance with the practice of this invention is present in a minor amount, in an amount less than about 10% by weight, usually in an amount in the range 0.01–5.0% by wt., more or less, based on the total drilling fluid or mud or additive admixture. Any organic water soluble oxygen-containing silicon compound is suitable for use in the practice of this invention. For example, water soluble organo or hydrocarbyl siliconates, such as the alkyl siliconates or silicones, e. g., methyl siliconates, ethyl siliconates and the like, particularly the sodium derivatives thereof, e. g., sodium alkyl siliconates such as sodium methyl siliconate (Dow Corning XS–1 and XS–2A), are suitable. Other suitable organo or hydrocarbyl (an organic radical containing only hydrogen and carbon atoms) oxygen-containing silicon compounds include the aryl siliconates, the alkyl silanols or the alkali metal alkyl silanols such as the alkali metal or alkaline earth metal salt of methyl silanol, methyl silanediol and methyl silanetriol. Particularly satisfactory in the practice of this invention is an admixture of sodium methyl siliconate and a sodium salt of the corresponding methyl silanols, monohydric and polyhydric. This material is readily available under the trade name Dow Corning XS–1 in aqueous solution form. The water solution sold as Dow Corning XS–1 contains 25% solids, has a pH of 13 and is essentially a water solution of sodium salts of organosilanols and organosiloxanols. The solution is strongly caustic. The water soluble organo oxygen-containing silicon compounds may be added directly to the drilling mud alone or in admixture with the other materials making up the drilling mud or additive admixture. The corresponding alkali metal or alkaline earth metal oxygen-containing silicon derivatives may be formed in situ within the drilling mud or these derivatives may be added directly to the drilling mud or included in the additive admixture.

In accordance with one feature of this invention the aqueous drilling fluid or drilling mud containing the organic water soluble oxygen-containing silicon compound is treated with a water soluble heavy metal or metallic compound, such as a water soluble metal salt, e. g., aluminum chloride, nickel chloride, chromium chloride, cobalt chloride, and the like to effect modification of the water soluble oxygen-containing silicon compound therein such as to form the corresponding metal derivative thereof.

As indicated hereinabove, in accordance with another feature of this invention there is provided a reagent or drilling mud additive admixture, preferably in dry solid form where possible but which also might be in aqueous slurry form, which when added to the drilling fluid, which may or may not contain a hydratable drilling clay therein, such as a bentonitic type drilling clay, provides the desired alkalinity and calcium ion content in the drilling fluid to which it is added as well as the desired amount or concentration of the water soluble oxygen-containing or silicon compound. Such a reagent or additive admixture would contain a water soluble calcium salt such as calcium chloride, lime or calcium hydroxide or even caustic soda (NaOH) as the alkalinity agent, a suitable clay dispersing agent such as a lignosulfonate, e. g., Kembreak, a commercial form of calcium lignosulfonate, or Q-Broxin, a heavy metal-containing lignosulfonate, together with a suitable amount of the organo water soluble oxygen-containing silicon compound. The composition of such an additive admixture containing a water soluble calcium salt, such as calcium chloride, an alkalinity agent such as lime or calcium hydroxide, a clay dispersing agent such as calcium lignosulfonate, e. g., Kembreak, and a water soluble organo oxygen-containing silicon compound such as a sodium alkyl siliconate, e. g., sodium methyl siliconate, is usually in the weight ratio range 1:2–10:2–12:0.01–1.0, respectively. Preferably in the additive admixture the weight ratio of the alkalinity agent, e. g., lime, to dispersing agent, e. g., Kembreak, is in the range 1:1–1.5. It is realized that the above-indicated weight ratio ranges are open to modification and adjustment depending upon the equivalent or molecular weights of the components making up the admixture, e. g., whether the components thereof are employed in anhydrous or hydrated form and depending upon the effective activity of the components employed thereon. A reagent or additive admixture containing calcium chloride, lime, calcium lignosulfonate and a sodium methyl siliconate, preferably an admixture of a sodium methyl siliconate, and the sodium salts of a mixture of methylsilanols, e. g., Dow Corning XS–1, appears to be very useful.

A typical unweighted drilling mud prepared in accordance with this invention and containing 7 lbs. per barrel of drilling mud additive containing calcium chloride, lime and a crude calcium lignosulfonate in the weight ratio range 1:5–6:5–6 together with a suitable effective amount of an organo water soluble oxygen-containing silicon compound in the range 0.01–3.0 lbs. per barrel, e. g., Dow Corning XS–1 in an amount in the range 0.10–10 lbs. per barrel of drilling mud would exhibit the following properties:

Mud weight—About 10 lbs. per gallon
Mud solids—Approximately 15% by vol.
pH—12.05
$P_f$—0.6
$M_f$—1.3
$Pm$—7.8 to about 10.0
Calcium ion (aqueous phase)—Equivalent to 2.5 cc. Versenate solution, as determined by the standard Versenate method described in API code RP–29.
Chloride ion (aqueous phase)—About 7300 p. p. m.
Viscosity, 600 R. P. M. Stormer—40.4 cps.

Base mud employed was a West Cote Blanche Bay mud.

$P_f$ is defined as number of cc. of N/50 $H_2SO_4$ required to titrate 1 cc. of aqueous phase (filtrate) of drilling fluid to a phenolphthalein end point and is a measure of the soluble hydroxyl ion content.

$M_f$ is defined as number of ccs. of N/50 $H_2SO_4$ required to titrate 1 cc. of aqueous phase (filtrate) of drilling fluid to methyl orange end point and is a measure of the soluble hydroxyl and carbonate ion content.

$Pm$ is defined as number of ccs. of N/50 $H_2SO_4$ required to tritrate 1 cc. of the whole mud.

In a drilling mud prepared in accordance with this invention by the addition of calcium chloride (calcium ion donor), calcium lignosulfonate (clay dispersing agent) and lime (alkalinity agent), separately along with the water soluble oxygen-containing silicon compound or in combination with the additive admixture, the lime acts primarily as an alkalinity agent to peptize the dispersant which, adsorbed on the calcium-base converted drilling clay particles, serves to disperse these clay particles. By maintaining the presence of free lime in the subject drilling muds, i. e., maintaining the aqueous phase saturated with respect to lime in the presence of a dissolved calcium salt (added calcium ion), the pH of the aqueous phase is never greater than 12.6, which value corresponds to the pH of a saturated aqueous solution of lime. The presence of calcium ions originating from the soluble calcium salt added to the drilling fluid causes the pH of the aqueous phase to be somewhat lower than 12.6, generally in a pH range 11.2–12.5, or lower, because of the common ion effect. In the usual practice of this invention drilling fluid is maintained at a pH in the range 11.7–12.2.

It is preferred that in the reagent admixture or in the drilling fluid the weight ratio of lime to dispersing agent, be in the range 1–1.5 to the drilling fluid. However, for reasons of economy it would be desirable whenever possible to increase the lime to dispersing agent ratio to 2:1, or at least 3:2. Also, it has been found desirable during drilling operations when drilling through heaving shale formations to maintain the free lime content, i. e., excess, undissolved lime, in the drilling mud at a value in the range 0.75–4.0 lbs. per barrel, preferably in the range 1.5–2.5 lbs. per barrel, thereby providing a reservoir to act as a stabilizer for the drilling mud alkalinity. Accordingly, it is preferred during active shale drilling that the free, undissolved lime content of the drilling mud should not be permitted to fall below 1.5 lbs. per barrel. Actual field practice has indicated that the need for lime and dispersant addition is advisable whenever the free lime content of the mud falls below about 1.5 lbs. per barrel or when the $P_f$ reaches 0.4 cc. N/50 $H_2SO_4$ (pH of below about 11.7).

The gel strength of the subject muds like the muds described in the above mentioned patent applications is somewhat different from the other conventional muds. For example, phosphate drilling muds have very low initial gel strength but the gel strength of phosphate muds usually continue to rise slowly with time until very high strength, almost rigid, gels are developed. Conventional lime base muds such as a high pH, lime-base and wherein the dissolved calcium content seldom rises above 20 to 40 parts per million by weight, exhibit a flash gel which is so flat as to appear to be practically non-existent (0–0) at proper solids-water ratios. The subject muds, however, are distinguishable by possessing an initial gel strength which is very low, the gel strength rising with time to a limited and relatively low value. The rate of gel strength increase or gel formation is moderate and is discernible in a standard ten minute test. The conventionally measured gel strength values of the subject muds normally run about 0–5 grams to 0–30 grams on a 0–10 minute test.

Drilling muds prepared in accordance with this invention have been adjusted to a high density of mud weight without exhibiting any anomalous reactions. The weighting performance of the subject muds has been highly satisfactory and little or no incidental water dilution or increased chemical treating has been required as mud weight is increased. Undoubtedly the ability of the subject muds to satisfactorily maintain a high density in the presence of seriously dispersing heaving or mud-making shales is due to the stability of the clay-water ratio which these muds exhibit because of their excellent shale-suppressing properties.

The resistance of the subject muds to gypsum contamination is excellent and salt (NaCl) resistance at least upwards to about 50,000 parts per million by weight is satisfactory. For example, satisfactory drilling muds may be prepared in accordance with the teachings of this invention when sea water is employed.

Drilling muds prepared or converted in accordance with this invention exhibit improved high temperature gelation properties. For example, drilling muds prepared in accordance with this invention and maintained in a quiescent state at a temperature of upwards of 350° F. for a period of at least 66 hours have readily reslurried.

When employing the subject muds during a drilling operation through heaving shale it is desirable to maintain the dissolved calcium content or calcium ion content of the aqueous phase (drilling fluid filtrate) at a value not under 200 parts per million by weight. For example, in actual drilling operations while drilling through seriously heaving shale formations it has been observed that when the calcium content of the filtrate dropped to a value slightly below 20 p. p. m., more particularly to a value of about 185 p. p. m., substantially none of the shale cuttings were being removed on the shaker screen. However, after adjusting the calcium content of the filtrate to a value of about 300 p. p. m. by the addition of a soluble calcium salt such as calcium chloride to the drilling mud, a definite increase in the amount of recovered shale cuttings was noticed. Accordingly, it is preferred while drilling through heaving shale to maintain the dissolved active calcium or calcium ion content available for shale suppression at a value in a range about 300–1000 p. p. m. or more by weight. Satisfactory drilling fluids, however, have been prepared containing upwards of 14,400 p. p. m. dissolved calcium.

The following tests are indicative of the practice of this invention and demonstrate how the high temperature properties of a base mud characterized by an aqueous phase saturated with calcium hydroxide and containing a relatively high calcium ion concentration of at least 200 parts per million by weight, are improved by incorporating or otherwise adding to the drilling mud an organo water soluble oxygen-containing silicon compound. In the tests an aqueous base mud was prepared using West Cote Blanche Bay hole mud treated with an admixture of calcium chloride, lime and a lignosulfonate, such as calcium lignosulfonate, in the approximate proportion 1:5–6:5–6 by weight. To the base mud was added the above admixture in an amount of 7 lbs. per barrel of mud. Varying amounts of a mixture of a sodium alkyl siliconate (sodium methyl siliconate) and sodium alkyl silanols, monohydric and polyhydric (sodium methyl silanol, sodium methyl silanediol and sodium methyl silanetriol) commercially available under the trade name Dow Corning XS–1 were added to the thus-treated base mud.

The thus-treated mud is then subjected to a high temperature bomb test at 300° F. or 350° F. for 24 hours and the appearance of the mud observed. The data obtained in these tests are set forth in accompanying Table I.

TABLE I

| Test No. | Mud and Additions | Temp. (°F.) | Shear (lb./100 ft.²) | Appearance of Mud |
|---|---|---|---|---|
| 1 | 14% Solids hole mud+7 lbs./bbl. of a solid admixture of calcium chloride, lime and a calcium lignosulfonate. | 300 | 2,138 | Solid. |
| 2 | Same as Test No. 1+½ lb./bbl. Dow Corning XS–1. | 300 | 1,500 | Paste. |
| 3 | Same as Test No. 1+2 lb./bbl. Dow Corning XS–1. | 300 | 680 | Liquid. |
| 4 | 15% Solids hole mud+7 lbs./bbl. of a solid admixture of calcium chloride, lime and a calcium lignosulfonate. | 350 | 2,750 | Solid. |
| 5 | Same as Test No. 4+2 lb./bbl. Dow Corning XS–1. | 350 | 918 | Liquid. |
| 6 | Same as Test No. 4+3 lb./bbl. Dow Corning XS–1. | 350 | 430 | Do. |

In accompanying Tables II and III there are indicated the properties of a shale control mud and the same mud treated in accordance with the practice of this invention before and after high temperature bombing. As indicated by the data presented in Tables II and III the high temperature properties of a shale control mud treated in accordance with this invention are improved.

TABLE II

[Shale Control Admixture (SCA) and oxygen-containing silicon compound added together in 15% WCBB Hole Mud, then aged and rolled 16 hours.]

*Properties of mud before bombing*

| Test No. | Type Mud and Additions | pH | Gels 0' | Gels 10' | Viscosity $V_{600}$ | Viscosity $V_{100}$ | $P_m$ | $P_f$ | $M_f$ | Cl- (p.p.m.) | Ca++ (p.p.m.) | Excess Ca(OH)$_2$ (lb./bbl.) | Time for Shale Hardening |
|---|---|---|---|---|---|---|---|---|---|---|---|---|---|
| 1 | 15% WCBB+7 lb./bbl. SCA | 12.25 | 4.0 | 4.5 | 29.3 | 116.5 | 10.7 | 1.6 | 2.2 | 6,650 | 880 | 2.5 | 145 hours. |
| 2 | 15% WCBB+7 lbs./bbl. SCA+2 lbs./bbl. Dow Corning XS-1. | 12.23 | 3.7 | 4.2 | 28.8 | 108.5 | 10.6 | 1.8 | 2.4 | 6,800 | 840 | 2.4 | Do. |
| 3 | 15% WCBB+7 lbs./bbl. SCA+3 lbs./bbl. Dow Corning XS-1. | 12.18 | 3.4 | 4.0 | 27.0 | 102.8 | 10.7 | 1.6 | 2.3 | 6,700 | 760 | 2.5 | Do. |
| 4 | 15% WCBB+7 lbs./bbl. SCA+5 lbs./bbl. Dow Corning XS-1. | 12.18 | 3.0 | 3.8 | 26.5 | 94.8 | 10.7 | 1.8 | 2.5 | 6,800 | 720 | 2.4 | Do. |
| 5 | 15% WCBB+7 lbs./bbl. SCA+8 lbs./bbl. Dow Corning XS-1. | 12.20 | ------ | 3.5 | 25.9 | 86.9 | 10.7 | 2.0 | 2.8 | 6,800 | 760 | 2.4 | Do. |

SCA—Shale control admixture containing CaCl$_2$, lime and a calcium lignosulfonate in the approximate weight ratio 1:3:4, respectively.

TABLE III

[SCA and silicon compound added together in 15% WCBB Hole Mud, then aged and rolled 16 hours.]

*Properties of mud after bombing 65 hours*

| Test No. | Type Mud and Additions | Temp. (° F.) | Shear (lbs./100 sq. ft.) | pH | $P_m$ | $P_f$ | $M_f$ | Cl- | Ca++ | Viscosity (600) | Appearance of Mud |
|---|---|---|---|---|---|---|---|---|---|---|---|
| 1 | 15% WCBB+7 lbs./bbl. SCA | 320 | 2,000 | 9.96 | 0.8 | 0.4 | 1.1 | 6,850 | 920 | -------- | Solid Plastic Paste. |
| 2 | 15% WCBB+7 lbs./bbl. SCA+2 lbs./bbl. Dow Corning XS-1. | 320 | 773 | 10.12 | 0.8 | 0.2 | 0.9 | 6,800 | 760 | 118.5 | Reslurried—medium gels. |
| 3 | 15% WCBB+7 lbs./bbl. SCA+3 lbs./bbl. Dow Corning XS-1. | 320 | 1,260 | 10.16 | 1.2 | 0.2 | 0.9 | 6,800 | 720 | 111.6 | Do. |
| 4 | 15% WCBB+7 lbs./bbl. SCA+5 lbs./bbl. Dow Corning XS-1. | 320 | 940 | 10.18 | 1.2 | 0.2 | 0.9 | 6,800 | 680 | 69.4 | Reslurried—medium to low gels. |
| 5 | 15% WCBB+7 lbs./bbl. SCA+8 lbs./bbl. Dow Corning XS-1. | 320 | 1,070 | 10.20 | 1.5 | 0.2 | 1.0 | 6,800 | 600 | 87.4 | Reslurried—medium gels. |

Table IV sets forth data obtained when a shale control mud was aged and rolled at 140° F. for 24 hours. Following this treatment a water soluble organo oxygen-containing silicon compound was added (Dow Corning XS-1) and the resulting mud aged and rolled for an additional 64 hours at 140° F. The mud was then bombed for 16 hours at 320° F. and the viscosity and the appearance of the mud then observed. The results of these tests are set forth in accompanying Table IV.

Table V sets forth the observations of similar tests save the final treated mud was not aged but was bombed at 320° F. immediately after the addition of the water soluble oxygen-containing organo silicon compound.

TABLE IV

| Test No. | Type Mud and Additions | Temp. (° F.) | Shear (lb./100 sq. ft.) | Viscosity (600) | Appearance of Mud |
|---|---|---|---|---|---|
| 1 | 15% WCBB+7 lbs./bbl. SCA | 320 | 1,700 | -------- | Solid plastic paste. |
| 2 | 15% WCBB+7 lbs./bbl. SCA+2 lbs./bbl. Dow Corning XS-1. | 320 | 622 | 94.6 | Reslurried—high gels. |
| 3 | 15% WCBB+7 lbs./bbl. SCA+3 lbs./bbl. Dow Corning XS-1. | 320 | 568 | 86.1 | Reslurried—medium gels. |
| 4 | 15% WCBB+7 lbs./bbl SCA+4 lbs./bbl. Dow Corning XS-1. | 320 | 759 | 75.2 | Do. |
| 5 | 15% WCBB+7 lbs./bbl. SCA+5 lbs./bbl. Dow Corning XS-1. | 320 | 747 | 68.0 | Reslurried—medium to low gels. |
| 6 | 15% WCBB+7 lbs./bbl. SCA+8 lbs./bbl. Dow Corning XS-1. | 320 | 1,142 | 60.1 | Reslurried—low gels. |

TABLE V

| Test No. | Type Mud and Additions | Temp. (° F.) | Shear (lb./100 sq. ft.) | Viscosity (600) | Appearance of Mud |
|---|---|---|---|---|---|
| 1 | 15% WCBB+7 lbs./bbl. SCA | 320 | 1,916 | -------- | Solid plastic paste. |
| 2 | 15% WCBB+7 lbs./bbl. SCA+3 lbs./bbl. Dow Corning XS-1. | 320 | 426 | 58.9 | Reslurried—medium to low gels. |

Tables No. VI and VII report data on tests similar to those carried out in connection with the data reported in Tables No. IV and V, save that a water soluble aluminum salt was also added to the mud system undergoing test.

TABLE VI
*Properties of mud before bombing*

| Test No. | Type Mud and Additions | pH | Gels 0' | Gels 10' | Viscosity V600 | Viscosity V100 | Pm | Pf | Mf | Cl⁻(p.p.m.) | Ca⁺⁺ (p.p.m.) | Excess Ca(OH)₂ (lb./bbl.) | Time for Shale Hardening |
|---|---|---|---|---|---|---|---|---|---|---|---|---|---|
| 1 | 15% WCBB + 7 lbs./bbl. SCA + 14 ml. H₂O.¹ | 12.1 | 2 / 0 | 10 / 0 | 14.3 | 44.7 | 11.3 | 1.4 | 2.4 | 5,400 | 840 | 2.5 | 148 hours. |
| 2 | 15% WCBB + 7 lbs./bbl. SCA + 3 lbs./bbl. Dow Corning XS-1 Silicone, neutralized to pH of 7.6 with 0.47 lb./bbl. AlCl₃.6H₂O. | 12.05 | 2 / 0 | 20 / 0 | 18.9 | 44.7 | 11.5 | 1.6 | 2.6 | 5,900 | 900 | 2.5 | Do. |
| 3 | 15% WCBB + 7 lbs./bbl. SCA + 5 lbs./bbl. Dow Corning XS-1 Silicone, neutralized to pH of 7.6 by 0.78 lb./bbl. AlCl₃.6H₂O. | 12.03 | 1.5 / 0 | 7 / 0 | 18.1 | 36.7 | 10.5 | 2.1 | 3.1 | 6,300 | 920 | 2.3 | Do. |
| 4 | 15% WCBB + 7 lbs./bbl. SCA + 8 lbs./bbl. Dow Corning XS-1 Silicone, neutralized to pH of 7.6 by 1.33 lbs./bbl. AlCl₃.6H₂O. | 11.9 | 1 / 0 | 3 / 0 | 11.1 | 23.0 | 10.3 | 2.3 | 3.2 | 6,500 | 920 | 2.2 | Do. |

¹ Since adding AlCl₃.6H₂O to XS-1 silicone used 14 ml. H₂O, added 14 ml. H₂O to base mud sample to compensate.

TABLE VII
*Properties after bombing for 64 hours*

| Test No. | Type Mud and Additions | Temp. (° F.) | Shear (lb./100 sq. ft.) | Viscosity (600) | Appearance | pH | Pm | Pf | Mf | Cl⁻ | Ca⁺⁺ |
|---|---|---|---|---|---|---|---|---|---|---|---|
| 1 | 15% WCBB + 7 lbs./bbl. SCA + 14 ml. H₂O.¹ | 320 | 1,710 | | Solid, Plastic Paste. | 9.9 | 1.7 | 0.3 | 1.5 | 6,900 | 820 |
| 2 | 15% WCBB + 7 lbs./bbl. SCA + 3 lbs./bbl. Dow Corning XS-1 Silicone, neutralized to pH of 7.6 with 0.47 lbs./bbl. AlCl₃.6H₂O. | 320 | 613 | 106.1 | Reslurried—medium gels. | 10.05 | 1.5 | 0.2 | 1.4 | 6,500 | 900 |
| 3 | 15% WCBB + 7 lbs./bbl. SCA + 5 lbs./bbl. Dow Corning XS-1 Silicone, neutralized to pH of 7.6 by 0.78 lb./bbl. AlCl₃.6H₂O. | 320 | 383 | 91.8 | ...do... | 10.05 | 1.3 | 0.25 | 1.4 | 6,400 | 940 |
| 4 | 15% WCBB + 7 lbs./bbl. SCA + 8 lbs./bbl. Dow Corning XS-1 Silicone, neutralized to pH of 7.6 by 1.33 lbs./bbl. AlCl₃.6H₂O. | 320 | 935 | 99.8 | ...do... | 10.05 | 1.5 | 0.2 | 1.3 | 5,700 | 980 |

¹ Since adding AlCl₃.6H₂O to XS-1 silicone used 14 ml. H₂O, added 14 ml. H₂O to base mud sample to compensate.

Additional test data setting forth results observed in tests similar to those reported in Tables VI and VII are reported in tables VIII and IX.

TABLE VIII
[Addition of AlCl₃.6H₂O to a Shale Control Mud after treatment with Dow Corning XS-1.]
*Properties of mud before bombing*

| Test No. | Type Mud and Additions | pH | Gels 0' | Gels 10' | Viscosity V600 | Viscosity V100 | Pm | Pf | Mf | Cl⁻ (p.p.m.) | Ca⁺⁺ (p.p.m.) | Excess Ca(OH)₂ lb./bbl. |
|---|---|---|---|---|---|---|---|---|---|---|---|---|
| 1 | 15% WCBB+7 lbs./bbl. SCA | 12.3 | 4 / 0 | 3.2 / --- | 22.3 | 76.6 | 12.1 | 1.8 | 2.6 | 5,900 | 1,040 | 2.7 |
| 2 | 15% WCBB+7 lbs./bbl. SCA+1 lb./bbl. Dow Corning XS-1+0.16 lb./bbl. AlCl₃.6H₂O. | 12.18 | 3 / 0 | 15 / 0 | 17.5 | 57.2 | 12.6 | 1.5 | 2.5 | 6,150 | 1,040 | 2.9 |
| 3 | 15% WCBB+7 lbs./bbl. SCA+5 lbs./bbl. Dow Corning XS-1+0.78 lb./bbl. AlCl₃.6H₂O. | 12.1 | 2 / 0 | 7 / 0 | 16.7 | 40.1 | 12.4 | 2.0 | 3.2 | 7,000 | 1,000 | 2.8 |
| 4 | 15% WCBB+7 lbs./bbl. SCA+8 lbs./bbl. Dow Corning XS-1+1.23 lb./bbl. AlCl₃.6H₂O. | 12.1 | 1.5 / 0 | 6 / 0 | 20.7 | 48.3 | 12.6 | 2.6 | 3.8 | 8,000 | 1,120 | 2.7 |

TABLE IX
*Properties after bombing for 64 hours*

| Test No. | Type Mud and Additions | Temp. (° F.) | Shear (lb./100 sq. ft.) | Appearance |
|---|---|---|---|---|
| 1 | 15% WCBB+7 lbs./bbl. SCA | 320 | 2,835 | Solid, plastic paste. |
| 2 | 15% WCBB+7 lbs./bbl. SCA+1 lb./bbl. Dow Corning XS-1+0.16 lb./bbl. AlCl₃.6H₂O. | 320 | 1,924 | Solid, semi-plastic. |
| 3 | 15% WCBB+7 lbs./bbl. SCA+5 lbs./bbl. Dow Corning XS-1+0.78 lb./bbl. AlCl₃.6H₂O. | 320 | 1,632 | Reslurried. |
| 4 | 15% WCBB+7 lbs./bbl. SCA+8 lbs./bbl. Dow Corning XS-1+1.23 lbs./bbl. AlCl₃.6H₂O. | 320 | 2,224 | Do. |

As is apparent from test data reported in accompanying Tables I thru IX the high temperature gelation properties of a shale control mud are substantially improved by incorporating in the shale control mud an organo water soluble oxygen-containing silicon compound, such as Dow Corning XS-1, which is an admixture of a sodium alkyl siliconate and sodium alkyl silanols.

As will be apparent to those skilled in the art many modifications, substitutions and alterations are possible in the practice of this invention without departing from the spirit or scope thereof.

I claim:

1. An aqueous drilling fluid comprising an alkaline aqueous phase saturated with calcium hydroxide, a water soluble calcium salt which has a solubility in said aqueous phase greater than that of calcium hydroxide dissolved therein to yield a calcium ion concentration in said aqueous phase of at least 200 parts per million by weight, said aqueous phase having a pH not greater than 12.6, and a minor amount in the range 0.01–10% by weight based on said fluid of a water soluble organic oxygen-containing silicon compound in said fluid.

2. An aqueous drilling mud comprising a hydratable clayey material dispersed in an alkaline aqueous phase saturated with calcium hydroxide, a dispersing agent for said clayey material, a water soluble calcium salt which has a solubility in said aqueous phase greater than that of calcium hydroxide dissolved therein to yield a calcium ion concentration in said aqueous phase of at least 200 parts per million by weight, said aqueous phase having a pH not greater than 12.6, and a minor amount in the range 0.01–10% by weight based on said mud of an organic water soluble oxygen-containing silicon compound in said mud.

3. A drilling mud in accordance with claim 2 wherein the concentration of calcium ion in the aqueous phase is in the range 300–1000 parts per million by weight.

4. A drilling mud in accordance with claim 2 wherein said organic water soluble oxygen-containing silicon compound is a siliconate.

5. A drilling mud in accordance with claim 2 wherein the concentration of calcium ion in said aqueous phase is in the range 300–1000 parts per million by weight and wherein said organic water soluble oxygen-containing silicon compound is an alkali metal alkyl siliconate.

6. A drilling mud in accordance with claim 2 wherein the concentration of calcium ion in said aqueous phase is in the range 300–1000 parts per million by weight and wherein said organic water soluble oxygen-containing silicon compound is an alkaline earth metal alkyl siliconate.

7. A drilling mud in accordance with claim 2 wherein the concentration of calcium ion in said aqueous phase is in the range 300–1000 parts per million by weight and wherein said organic water soluble oxygen-containing silicon compound is an arylsiliconate.

8. A drilling mud in accordance with claim 2 wherein the concentration of calcium ion in said aqueous phase is in the range 300–1000 parts per million by weight and wherein said organic water soluble oxygen-containing silicon compound is an alkyl substituted silanol.

9. A water base drilling mud comprising an alkaline aqueous phase having a pH in the range 11.2–12.5, a hydratable drilling clay dispersed in said aqueous phase, a dispersing agent for said clay and a minor amount in the range 0.01–10% by weight based on said mud of an organic water soluble oxygen-containing silicon compound, said aqueous phase comprising a saturated aqueous solution of calcium hydroxide and a water soluble calcium salt which has a solubility in said aqueous phase greater than that of calcium hydroxide dissolved therein to yield a calcium ion concentration in said aqueous phase of at least 200 parts per million by weight.

10. A drilling mud in accordance with claim 9 wherein said dispersing agent is a lignosulfonate.

11. A drilling mud in accordance with claim 9 wherein said dispersing agent is calcium lignosulfonate.

12. A drilling mud in accordance with claim 9 wherein said calcium salt is calcium chloride.

13. A drilling mud in accordance with claim 9 wherein said calcium salt is calcium sulfate.

14. A drilling mud in accordance with claim 9 wherein said calcium salt is calcium nitrate.

15. A drilling mud in accordance with claim 9 wherein said calcium salt is calcium acetate.

16. A drilling mud in accordance with claim 9 wherein said calcium salt is calcium formate.

17. A drilling mud in accordance with claim 9 wherein said organic water soluble oxygen-containing silicon compound is a sodium methyl siliconate.

18. A drilling mud in accordance with claim 9 wherein said organic water soluble oxygen-containing silicon compound is a silanol.

19. A drilling mud in accordance with claim 9 wherein said organic water soluble oxygen-containing silicon compound is an admixture of a sodium methyl siliconate and a sodium salt of an alkyl-substituted silanol.

20. A drilling mud in accordance with claim 9 wherein the pH of said aqueous phase is in the range 11.7–12.2, wherein said dispersing agent is calcium lignosulfonate, wherein said calcium salt is calcium chloride and wherein said aqueous phase contains a calcium ion concentration in the range 300–1000 parts per million by weight.

21. A drilling mud in accordance with claim 9 wherein said organic water soluble oxygen-containing silicon compound is an organosilicate.

22. In the drilling of a bore hole through a heaving shale formation wherein a drilling fluid is passed through the bore hole in contact with the heaving shale formation during the drilling operation the improvement which comprises contacting said heaving shale formation with an aqueous drilling fluid comprising an alkaline aqueous phase having a pH not greater than 12.6, said aqueous phase comprising a saturated aqueous solution of calcium hydroxide, a water soluble calcium salt which has a solubility in said aqueous phase greater than that of calcium hydroxide dissolved therein to yield a calcium ion concentration of at least 200 parts per million by weight and a minor amount in the range 0.01–10% by weight based on said fluid of an organic water soluble oxygen-containing silicon compound.

23. In the drilling of a bore hole through a heaving shale formation wherein a drilling mud is passed through the bore hole in contact with the heavying shale formation during the drilling operation the improvement which comprises contacting said heaving shale formation with an aqueous drilling mud comprising a hydratable clayey material dispersed in an alkaline aqueous phase having a pH not greater than 12.6, a dispersing agent for said clayey material, said aqueous phase comprising a saturated aqueous solution of calcium hydroxide, a water soluble calcium salt which has a solubility in said aqueous phase greater than that of calcium hydroxide dissolved therein to yield a calcium ion concentration of at least 200 parts per million by weight and a minor amount in the range 0.01–10% by weight based on said mud of an organic water soluble oxygen-containing silicon compound.

24. A method in accordance with claim 23 wherein said drilling mud contains a lignosulfonate as said dispersing agent.

25. A method in accordance with claim 23 wherein said aqueous drilling mud contains a sodium salt of a polymeric polyphenol derivative obtained as an extract of hemlock bark as said clay dispersing agent.

26. A drilling mud additive suitable for use in the preparation of an aqueous alkaline drilling fluid having a pH less than 12.6 consisting essentially of calcium chloride, lime, calcium lignosulfonate and an organic water soluble oxygen-containing silicon compound in the weight ratio range 1:2–10:2–10:0.01–1, respectively.

27. An additive in accordance with claim 26 wherein said admixture consists essentially of calcium chloride, lime, calcium lignosulfonate and a sodium alkyl siliconate in the weight ratio range 1:5–6:5–6:0.01–1, respectively.

28. A drilling mud additive consisting essentially of a water soluble calcium salt which has a solubility in water greater than that of calcium hydroxide, lime, a ligno-sulfonate clay dispersing agent and an organic water soluble oxygen-containing silicon compound in the weight ratio range 1:2–10:2–10:0.01–1, respectively.

29. A drilling mud additive comprising a water soluble calcium salt which has a solubility in water greater than that of calcium hydroxide, lime, a clay dispersing agent and an organic water soluble oxygen-containing silicon compound, the relative proportion of said calcium salt, lime, clay dispersing agent and said silicon compound being in the weight range 1:2–10:2–10:0.01–1, respectively.

References Cited in the file of this patent

UNITED STATES PATENTS

| | | |
|---|---|---|
| 2,491,436 | Barnes | Dec. 13, 1949 |
| 2,676,147 | Mulligan | Apr. 20, 1954 |
| 2,726,207 | Healey | Dec. 6, 1955 |
| 2,802,783 | Weiss et al. | Aug. 13, 1957 |